UNITED STATES PATENT OFFICE.

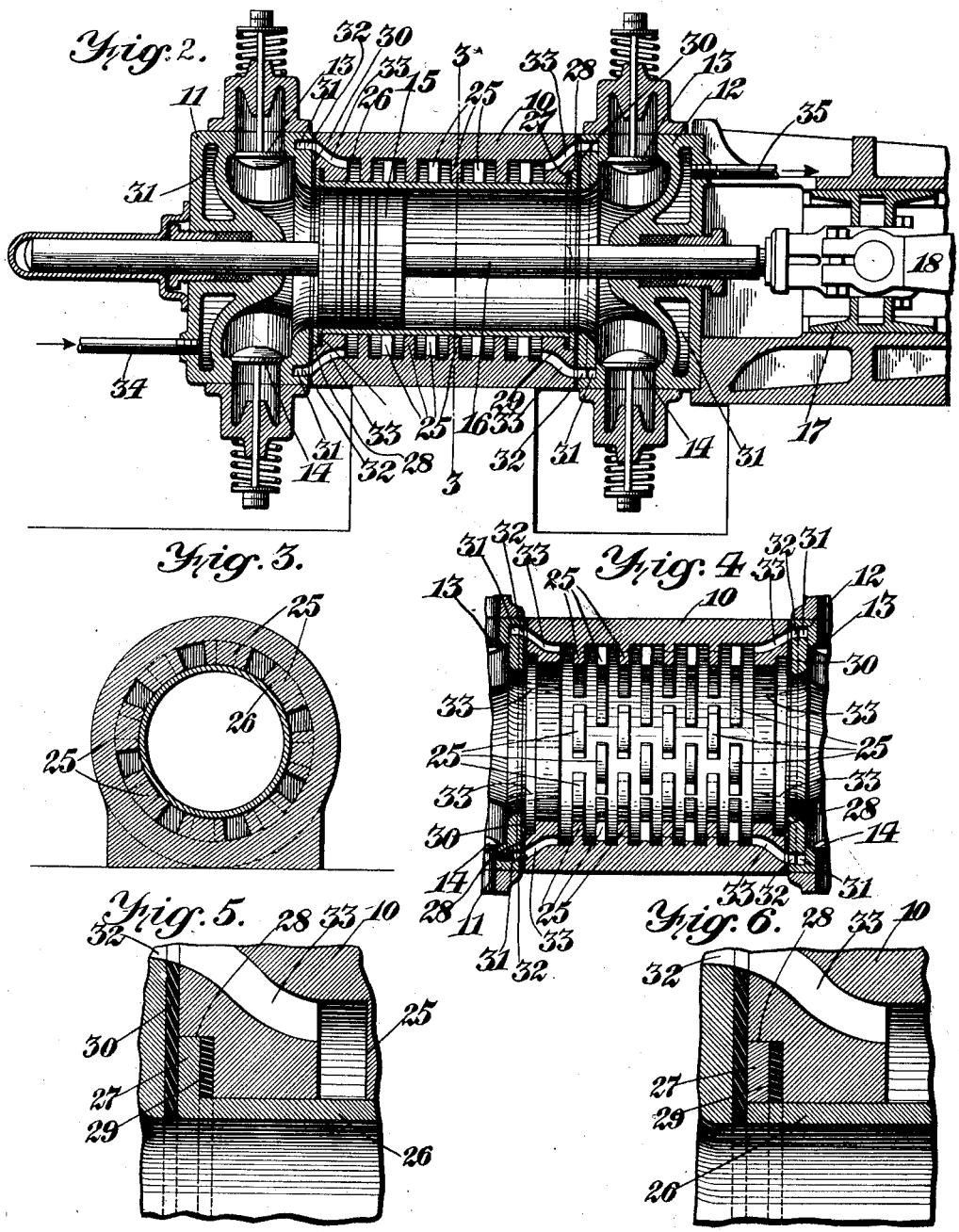

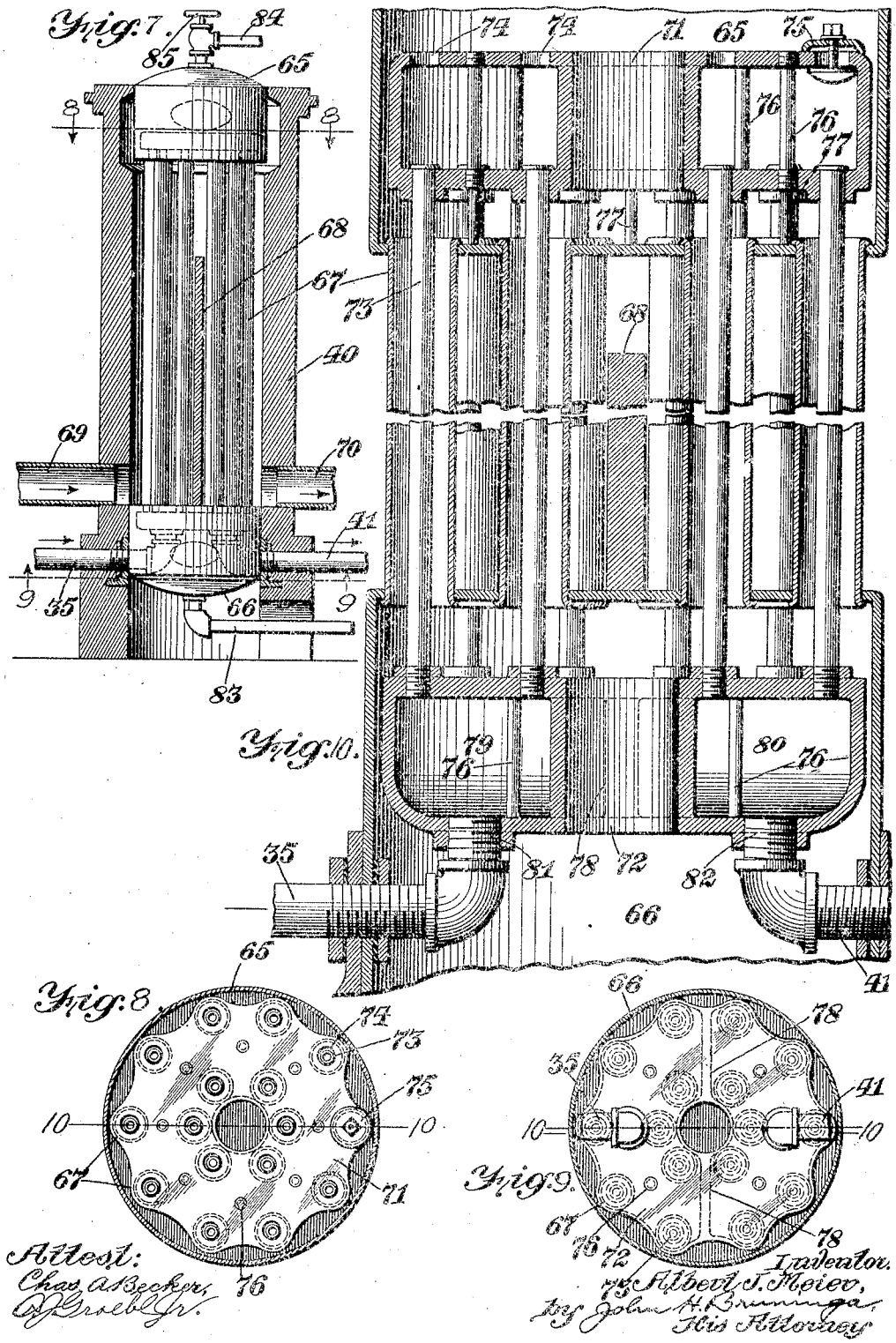

ALBERT J. MEIER, OF GLENDALE, MISSOURI.

POWER-GENERATING SYSTEM.

1,352,616.  Specification of Letters Patent.  Patented Sept. 14, 1920.

Application filed March 21, 1913. Serial No. 756,033.

*To all whom it may concern:*

Be it known that I, ALBERT J. MEIER, a citizen of the United States, and residing at Glendale, in the State of Missouri, have invented certain new and useful Improvements in Power-Generating Systems, of which the following is a specification.

This invention relates to a power generating system and more particularly to a system employing a heat engine of the internal combustion type.

In the operation of internal combustion engines the pressure generated by the combustion in the pressure chamber or cylinder of the engine is exceedingly high. It is therefore necessary to make such engines of heavy construction, which not only increases their cost but also their wieght. Such engines are generally cooled by water which is circulated through the water jacket of the cylinder. Now in order that the cylinder may be able to withstand the heavy pressures generated therein the interior shell, that is, the inside wall between the inside of the cylinder and the water must be made comparatively thick. The heat must therefore pass by conduction through this thick wall before it can reach the water.

The quantity of heat conducted through a wall varies inversely as the thickness of the wall. The greater therefore the thickness of the interior shell separating the interior of the cylinder from the water the smaller will be the quantity of heat transferred to the water. The greater the thickness of this shell the greater also will be the difference in temperatures between the opposite faces of the shell. If therefore this shell is comparatively thick, as is the case with cast iron constructions, there is a considerable difference between the temperature of the inside wall which is in contact with the hot gases, and that of the outside wall which is in contact with the water in the water jacket. The piston traveling in contact with the inside wall will therefore remain at a high temperature. This variation in the temperature throughout the shell and the high temperature of the piston results in unequal expansion and contraction of the wall and of the piston which will place these walls under a great strain so that the wall is liable to crack and the piston liable to bind. If however the interior shell be made comparatively thin then the quantity of heat conducted through the wall will not only increase as this thickness is decreased but the wall is maintained at practically a uniform temperature throughout.

One of the objects of this invention therefore is to produce a power generating system and a new method of operating a heat engine whereby the interior shell of the cylinder between the water and the inside of the cylinder can be made sufficiently thin so that the conduction of the heat from the hot gases to the cooling medium can be accomplished efficiently, and whereby this shell will be kept at practically a uniform temperature throughout.

It is not possible in internal combustion engines as now constructed and operated to carry the temperature of the cooling water near its boiling point. Furthermore in view of the fact that the thickness of the interior shell must necessarily be great, as pointed out above, it is necessary to keep the water at as low a temperature as possible in order that the cylinder may be kept sufficiently cool to prevent binding of the piston. It is not only unnecessary that the cooling medium be kept at such a low temperature but this low temperature of the cooling medium will also result in unnecessary waste of heat.

Another object therefore is to provide a method and means whereby the cooling medium can be maintained at a temperature which may be higher than its normal boiling point.

The objects of this invention are to provide a method and means for conserving and utilizing the heat in the cooling fluid and also the heat of the exhaust gases, and to provide a heat absorber which will accomplish this.

Further objects will appear from the detail description taken in connection with the accompanying drawings in which:

Fig. 2 is a longitudinal section through the cylinder of the engine;

Fig. 3 is a section on the line 3—3, Fig. 2;

Fig. 4 is a section similar to Fig. 2 with the liner removed;

Fig. 5 is a detail section of the joint formed between the liner and the cylinder;

Fig. 6 is a view similar to Fig. 5, and showing another embodiment of this invention;

Figure 1:
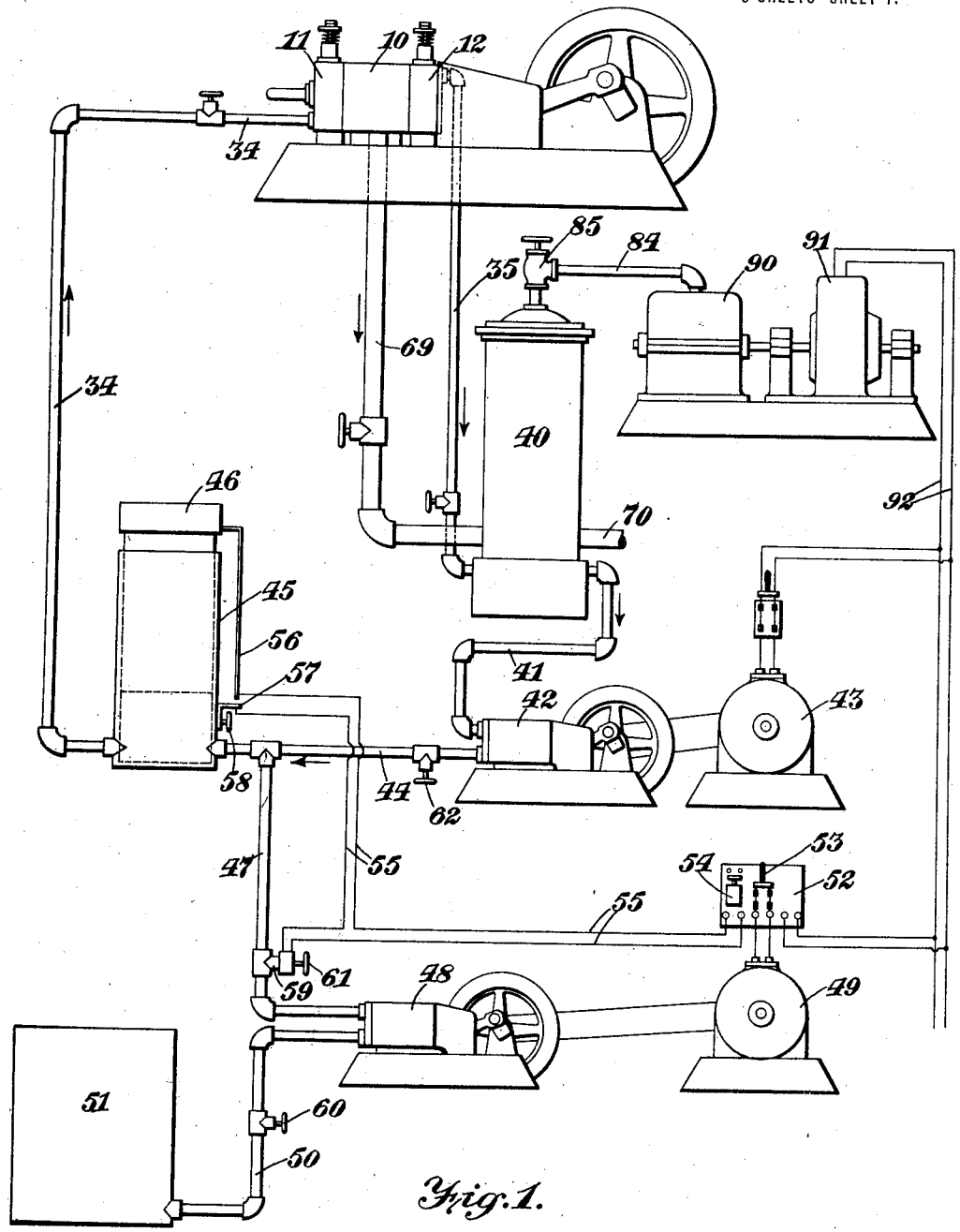
Figure 1 is a diagram illustrating the power generating system embodying this invention.

Fig. 7 is an enlarged vertical section through the heat absorber, the headers or drums and the tubes being shown in elevation, Fig. 8 is an enlarged section on the line 8—8 Fig. 7, Fig. 9 is an enlarged section on the line 9—9 Fig. 7, and Fig. 10 is an enlarged section on the lines 10—10 Figs. 8 and 9.

In accordance with this invention the inside shell of the cylinder is formed as a liner which is made comparatively thin. The tensile strength of the liner is not depended upon to keep it from bursting under the internal pressure in the cylinder but this liner is subjected externally to a pressure which will counteract the pressure generated in the cylinder. This is accomplished by maintaining the fluid in the water jacket under a high pressure so that this external pressure on the liner will sustain it against the internal pressure generated in the cylinder by the combustible gases. In view of the fact that the cooling fluid is maintained under a high pressure, it can be superheated, that is, it can be heated to a point above its normal boiling point without changing from its liquid state.

Referring now to the accompanying drawings and more particularly to Figs. 2 to 6 inclusive, 10 designates the body of the cylinder having heads 11 and 12 bolted thereto. The valves and valve passages are mounted on and located in these heads, the inlet valves being shown at 13 and the exhaust valves at 14, these valves being of usual construction and being operated in the usual manner. A piston 15 operates in the cylinder and has a piston rod 16 connected to a cross-head 17, which is in turn connected by a connecting rod 18 with a crank on the crank shaft. The parts thus generally described are of the usual construction and need not be further described. In the specific construction shown the engine is of the double acting type; the invention may however, be embodied in other types.

The inside of the cylinder has a series of inwardly projecting spaced lugs 25, these lugs being spaced both longitudinally and circumferentially of the cylinder, and staggered longitudinally of the cylinder as shown in Figs. 3 and 4. The inside faces of the lugs are bored so as to make a fit (preferably a driving fit) with a liner 26. In practice the body of the cylinder will be constructed of cast iron and will be comparatively thick, but the liner 26 is constructed of a material, such as steel, having a high tensile and compressive strength, and this liner is made comparatively thin. The ends of the liner are flanged as shown at 27 and these flanges take into recesses 28 in the ends of the cylinder. A gasket 29 is interposed between the flange and the cylinder, and a gasket 30 is interposed between the cylinder head and the cylinder, the flange 27 and the liner 26. This makes a water and gas tight joint between the liner and the cylinder and cylinder head. The liner may be secured in position by first flanging one end, inserting it into the cylinder and then rolling over the other flange; or one of the flanges may be threaded on the end of the liner as shown in Fig. 6.

There is thus formed between the liner and the cylinder body a water jacket. This water jacket connects with the jacket 31 in the cylinder heads by means of passages 32 and 33 in the cylinder head and cylinder respectively. The water is admitted into the lower end of one cylinder head by means of a pipe 34 and is discharged at the upper end of the other cylinder head by means of the pipe 35.

The water or other fluid is circulated through the water jacket of the cylinder under pressure as follows: Referring to Fig. 1, which shows the engine heretofore described diagrammatically, 40 designates a radiator which is connected with and receives the cooling fluid from the pipe 35. This radiator is connected by a pipe 41 with a pump 42 driven by a motor 43. This pump is connected by a pipe 44 with an accumulator 45 having a weighted piston 46. The accumulator is connected with the pipe 34 as shown.

A pipe 47 connects the accumulator with an auxiliary pump 48 driven by a motor 49, and this pump receives the water through a pipe 50 connected to a source of supply 51. The driving motor 49 is provided with a controller 52 having a hand operated switch 53 and an electrically operated switch 54. The electrically operated switch 54 has a controlling circuit 55, one terminal of which is connected to a contact 56 moving with the piston 46 of the accumulator and the other terminal of which is connected to a contact 57 mounted on the accumulator body and adjustable toward and from the contact 56 by means of a handle 58. The pipes 47 and 50 are provided with valves 59 and 60 respectively. The valve 59 is of the electrically operated type and is so constructed and connected that when the circuit 55 is closed by the contacts 56 and 57 the valve 59 will be automatically opened and when the circuit 55 is opened the valve will be automatically closed. This valve is also provided with a handle 61 whereby it may be opened and closed manually. The controller 52 and the valve 59 are well known commercial appliances and it is, therefore, unnecessary to describe them in detail.

The circulating system comprising the radiator 40, the circulating pump 42, the accumulator 45 and the cylinder jacket is supplied with water by means of the auxiliary pump 48 while the valves 59 and 60 are open. The auxiliary pump 48 is operated by means of its motor 49, controlled through its manually operable switch 53, until the desired quantity of water under the desired pressure has been stored in the system. The valve 59 is then closed and the pump 48 stopped by opening the switch 53. The contacts 56 and 57 are then set so that they are just out of contact as shown in Fig. 1. The circulating pump 42 is now set in operation to circulate the water through the circulating system. The accumulator will maintain the water under the desired pressure while circulated through the system by the circulating pump 42. If for any reason the pressure should drop, due to leakage, breakage, etc., and, therefore, cause the quantity or volume of water in the circulating system and in the accumulator to decrease, the accumulator piston will drop, thus causing the contacts 56 and 57 to close the circuit 57 controlling the valve 59 and the automatic switch 54, so as to open the valve 59 and start the motor 49 to cause the pump 48 to replenish the water in the accumulator, and therefore, reëstablish the pressure and volume therein. This increase in pressure and volume will cause the piston 46 to rise until the contacts 56 and 57 are broken, thereby stopping the pump 48 and closing the valve 59. The pressure of the water in the circulating system as well as its volume will, therefore, be maintained automatically at a predetermined value. The pressure of the water in the system can be varied within certain limits by adjusting the contact 56 so as to increase the length of the water column. For large differences in pressure, however, the weight of the piston is increased in the usual way.

With this system it is possible to maintain a high pressure in the water jacket of the engine cylinder which pressure may be made equal to or higher or lower than the maximum pressure in the cylinder. Since the liner 26 is thus surrounded by water under pressure, this pressure will sustain the liner against the pressure generated in the cylinder by combustion of the gases. If the external pressure is equal to the internal pressure then the liner will be balanced during the operation of the engine. The compressive strength of some materials, such as steel, is greater than its tensile strength; the external pressure can, therefore, be increased to a point greater than the liner will bear if the same pressure were applied internally. Cylinders under external pressure usually fail by collapsing; this is, however, provided for in this case by supporting the liner at uniformly spaced points both longitudinally and circumferentially around the cylinder. The liner can, therefore, not fail by collapsing, and since its strength is greater when the pressure is applied externally than when the pressure is applied internally, the thickness of the cylinder can be made just sufficient to withstand the external pressure (with the usual factor of safety). The liner will, therefore, be supported against the internal pressure by the hydraulic pressure in the circulating system. The hydraulic pressure can be made great enough to equal the maximum pressure generated in the cylinder; in practice, however, it is only necessary to make this external pressure equal to the maximum internal pressure minus the pressure required to cause the liner to burst (with the usual factor of safety). The actual pressure used in practice will, of course, vary with conditions, with the types of engines and with the character of fuel used. Thus in engines of the Diesel type the pressures generated are higher than in engines using gasolene by explosion. With this system, however, it is possible to adjust the pressure to any desired value and keep it at that value automatically.

In view of the fact that the thickness of the interior shell can be made very small, many advantages are obtained. The engine cylinder is reduced in weight. In view of the fact that the wall separating the interior of the cylinder from the water is comparatively thin, the conduction of the heat through the wall and to the water will be accomplished with maximum efficiency as pointed out above. The liner will therefore be kept at practically a uniform temperature which will equalize the strain in the liner and prevent failure due to expansion and contraction. The piston will also be maintained at a uniform and comparatively low temperature so that binding of the piston in the cylinder will be prevented. Since the wall is thin and since its temperature will be maintained practically uniform throughout, the temperature of the cooling water can be maintained higher. In view of the fact that the water in the circulating system is maintained under pressure it can be superheated, that is, its temperature can be carried considerably above its boiling point, and still cause the liquid to be maintained in liquid form. Since the cooling medium can thus be maintained at a high temperature the loss due to conduction to the water will be very much reduced. While the radiator may be water cooled it is not necessary in this system since the temperature of the cooling medium will be very much above the ordinary temperature of the air, even in summer, so that the radiator can be air cooled. The cooling medium may be water, oil or another suitable liquid or fluid.

If through any cause the circulating system should become broken or defective the radiator and pump 42 may be cut out by closing valves 62 and 63. The water may then be maintained in the water jacket under pressure and the system operated temporarily by the accumulator supplied by the pump 48. The electrical controlling means for the pump 48 and the valve 59 will maintain the pressure and volume in the accumulator and in the water jacket constant.

The variation of the pressure in the circulating system will vary the temperature of the fluid circulating therein in view of the fact that the fluid is superheated. The auxiliary pump 48 together with the electrical controlling means for this pump and the valve 59, therefore, provide means for controlling the temperature of the fluid and for automatically maintaining that temperature at a predetermined value. The temperature of the fluid can, therefore, be adjusted and controlled to suit different conditions. Since the liner is thin this liner will be kept at the temperature of the fluid. The temperature of the inside cylinder can, therefore, be maintained constant.

Referring now to Figs. 7 to 10 inclusive, the body of the heat absorber 40 is composed of fire brick or the like to form a furnace. This heat absorber comprises upper and lower drums or headers 65 and 66 connected by water tubes 67. A partition wall 68 extends vertically and across the furnace and between the tubes and nearly to the top of the furnace. The exhaust gases are conducted from the engine by the exhaust pipe 69 which discharges into the furnace at a point just above the lower drum, and these gases pass upwardly along the tubes and in contact with the upper drum and downwardly to a discharge pipe 70 leading to a chimney or stack or to the open air. The apparatus so far described may be of substantially the same construction as an ordinary water tube boiler.

The drums or headers 65 and 66 have mounted therein headers 71 and 72 connected by tubes 73. These tubes may be screwed or expanded into one or both headers, or they may be screwed into the lower header and expanded into the upper header as shown in Fig. 10. The upper header is provided with hand-holes 74 arranged opposite the tubes 73 so that these tubes may be readily removed and replaced, and these hand-holes are closed by hand-hole plates 75. In order to strengthen the header walls they are connected by stay bolts 76, and the stay bolts for the upper header are provided with extensions 77 adapted to rest on the lower wall of the drum 65 so as to hold the upper header 71 in spaced relation with respect to the upper drum 65, and so as to position the tubes 73 centrally and in spaced relation with respect to the water tubes 67. The upper header has a single chamber or compartment, but the lower header is divided by partitions 78 into two compartments 79 and 80. The pipe 35 extends into the drum 66 and makes a connection with the compartment 79 as shown at 81, and the pipe 41 also extends into the drum 66 and makes a connection with the compartment 80 as shown at 82. It will be understood that suitable water tight joints are made between the pipes 35 and 41 and the drum. The drum 66 is provided with the usual blow off pipe 83, and the drum 65 is provided with the usual steam pipe 84 controlled by a valve 85.

The superheated water from the water jacket passes from the pipe 35 to the compartment 79, thence upwardly through the tubes 73 on the left hand side of the wall or partition 68, into the upper header, then downwardly through the tubes 73 on the right hand side of the partition or wall 68 into the compartment 80 and from thence to the pipe 41. It will therefore be noted that the exhaust gases and superheated water from the engine travel in the same direction through the absorber. This will cause a circulation of the water in the drums and water tubes in a clockwise direction from one drum to the other.

The heat in the superheated water and in the exhaust gases is absorbed by the water in the drums 65 and 66, and tubes 67, and the upper drum forms a steam drum as in an ordinary boiler.

The steam generated can be used in any suitable manner. Referring to Fig. 1, 90 designates a steam turbine or other form of engine which receives the steam from the drum 65 through the steam pipe 84. The turbine 90 drives a generator 91 delivering current to a transmission line 92. This transmission line may have connected thereto suitable energy transforming devices and may be connected to operate the motors 43 and 49 as shown.

The absorber both absorbs and utilizes the heat in the circulating fluid and also the heat in the exhaust gases, and this heat is used to generate power which may be used in the system itself, or may be used to furnish power for additional power transforming devices. It will be understood that the transmission line 92 may have additional generating means, such as a dynamo or storage battery, so that the system can be started or even operated by such additional generating means.

It will thus be seen that this invention accomplishes its objects. The internal combustion engine cylinder is maintained at a uniform temperature so that there will be no excessive strains, or losses of heat due to transmission to the circulating fluid. The heat in the circulating fluid as well as the heat in the exhaust gases is conserved and utilized. The amount of circulating fluid necessary for keeping the engine cool is therefore small which adapts the system especially to places where the water supply is limited, as on ships, etc. The circulating cooling medium may be water, oil, or any other suitable liquid or fluid.

It is obvious that various changes may be made in the details of the method and apparatus without departing from the spirit of this invention and it is therefore to be understood that this invention is not to be limited to the specific details shown and described.

Having thus described the invention what is claimed is:

1. The method of generating power through the medium of a heat engine having a pressure chamber or cylinder, comprising, maintaining a motive fluid, containing energy in the form of heat, inside of the pressure chamber or cylinder, maintaining the walls of the pressure chamber or cylinder under an external pressure of a heat absorbing fluid to counteract the motive fluid pressure, and utilizing the heat absorbed by the heat absorbing fluid.

2. The method of generating power through the medium of a heat engine having a pressure chamber or cylinder, comprising, maintaining a motive fluid, containing energy in the form of heat, inside of the pressure chamber or cylinder, maintaining the walls of the pressure chamber or cylinder under an external pressure of a heat absorbing fluid to counteract the motive fluid pressure, and utilizing the heat of the heat absorbing fluid to generate power to maintain the fluid under pressure.

3. The method of generating power through the medium of an internal combustion engine having a pressure chamber or cylinder and employing a heat absorbing cooling medium, comprising, igniting a combustible gas in said pressure chamber or cylinder, maintaining the cooling medium under pressure to counteract the pressure of the ignited gas and support the walls of the pressure chamber or cylinder against the internal pressure therein, and utilizing the heat absorbed by the cooling medium and the heat of the exhaust of the engine.

4. The method of generating power through the medium of an internal combustion engine having a pressure chamber or cylinder and employing a heat absorbing cooling medium, comprising, igniting a combustible gas in said pressure chamber or cylinder, circulating the cooling medium under pressure externally of the cylinder to counteract the pressure of the ignited gas, and utilizing the heat absorbed by the cooling medium to generate power to circulate the cooling medium.

5. The method of generating power through the medium of an internal combustion engine having a pressure chamber or cylinder and employing a heat absorbing cooling medium, comprising, igniting a combustible gas in said pressure chamber or cylinder, circulating the cooling medium under pressure externally of the cylinder to counteract the pressure of the ignited gas, and utilizing the heat absorbed by the cooling medium to generate power to circulate the cooling medium and maintain the cooling medium under pressure.

6. The method of generating power through the medium of an internal combustion engine having a pressure chamber or cylinder and employing a heat absorbing cooling medium, comprising, igniting a combustible gas in said pressure chamber or cylinder, maintaining the cooling medium under pressure to counteract the pressure of the ignited gas and support the walls of the pressure chamber or cylinder against the internal pressure therein, and utilizing the heat absorbed by the cooling medium and the heat of the exhaust of the engine to generate power to maintain the pressure of the cooling medium.

7. The method of generating power through the medium of an internal combustion engine having a pressure chamber or cylinder and employing a heat absorbing cooling medium, comprising, igniting a combustible gas in said pressure chamber or cylinder, circulating the cooling medium under pressure externally of the cylinder to counteract the pressure of the ignited gas, and utilizing the heat absorbed by the cooling medium and the heat of the exhaust to generate power to circulate the cooling medium.

8. The method of generating power through the medium of an internal combustion engine having a pressure chamber or cylinder and employing a heat absorbing cooling medium, comprising, igniting a combustible gas in said pressure chamber or cylinder, employing the cooling medium under pressure and at a temperature greater than its normal boiling point to counteract the pressure of the ignited gas, and utilizing the heat absorbed by said cooling medium to heat another medium.

9. The method of generating power through the medium of an internal combustion engine having a pressure chamber or cylinder and employing a heat absorbing cooling medium, comprising, igniting a combustible gas in said pressure chamber or cylinder, employing the cooling medium under pressure and at a temperature greater than its normal boiling point to counteract the pressure of the ignited gas, and discharging the engine exhaust and the heated cooling medium into a common heat absorber to heat another medium.

10. The method of generating power through the medium of an internal combustion engine having a pressure chamber or cylinder and employing a heat absorbing cooling medium, comprising, igniting a combustible gas in said pressure chamber or cylinder, employing the cooling medium under pressure and at a temperature greater than its normal boiling point to counteract the pressure of the ignited gas, and utilizing the heated cooling medium to heat another medium having a boiling point lower than the temperature of said cooling medium.

11. The method of generating power through the medium of an internal combustion engine having a pressure chamber or cylinder and employing a heat absorbing cooling medium, comprising, employing the cooling medium under pressure and at a temperature greater than its normal boiling point to counteract pressure of the ignited gas in the cylinder, utilizing the heated cooling medium to vaporize another medium, and utilizing the vaporized medium to generate power.

12. The method of generating power through the medium of an internal combustion engine having a pressure chamber or cylinder and employing a heat absorbing cooling medium, comprising, igniting a combustible gas in said pressure chamber or cylinder, employing the cooling medium under pressure and at a temperature greater than its normal boiling point to counteract the pressure of the ignited gas, and utilizing the heated cooling medium and the engine exhaust to vaporize another medium.

13. The method of generating power through the medium of an internal combustion engine having a pressure chamber or cylinder and employing a heat absorbing cooling medium, comprising igniting a combustible gas in said pressure chamber or cylinder, employing the cooling medium under pressure and at a temperature greater than its normal boiling point to counteract the pressure of the ignited gas, utilizing the heated cooling medium and the engine exhaust to vaporize another medium, and utilizing the vaporized medium to generate power.

14. In a power generating system, a heat engine having a jacket adapted to receive a heat absorbing fluid, and a heat absorber connected to receive the heated fluid from said jacket, said heat absorber having a fluid maintained separate from and to be heated by the heated fluid received from said jacket.

15. In a power generating system, a heat engine having a jacket adapted to receive a heat absorbing fluid, and a heat absorber connected to receive the heated fluid from said jacket and the heat of the exhaust from said engine, said heat absorber having a fluid maintained separate from and to be heated by the heated fluid received from said jacket.

16. In a power generating system, a heat engine having a jacket adapted to receive a heat absorbing fluid, a steam generator having its water separate from and to be heated by the fluid heated in said jacket connected to absorb the heat of the fluid heated in said jacket, and an engine receiving steam from said generator.

17. In a power generating system, a heat engine having a jacket adapted to receive a heat absorbing fluid, means for circulating the fluid in said jacket, and a heat absorbing and power generating unit receiving the heated fluid from said jacket and adapted to drive said circulating means, said unit having a fluid maintained separate from and to be heated by the fluid heated in said jacket.

18. In a power generating system, a heat engine having a jacket adapted to receive a heat absorbing fluid, means for circulating the fluid in said jacket, and a heat absorbing and power generating unit receiving the heated fluid from said jacket and the exhaust from the engine, said unit having fluid maintained separate from and to be heated by the fluid heated in said jacket.

19. In a power generating system, a heat engine having a pressure chamber or cylinder and a jacket adapted to receive a heat absorbing fluid, means for maintaining the fluid in said jacket under pressure to counteract the motive fluid pressure in said cylinder, and a heat absorbing and power generating unit receiving the heated fluid from said jacket and adapted to operate said pressure maintaining means.

20. In a power generating system, a heat engine having a cylinder and a jacket adapted to receive a heat absorbing fluid, means for circulating the fluid under pressure in said jacket to counteract the pressure in said cylinder, and a heat absorber adapted to receive the heated fluid from said jacket and utilize the heat thereof.

21. In a power generating system, a heat engine having a cylinder and a jacket adapted to receive a heat absorbing fluid, means for circulating the fluid under pressure in said jacket to counteract the pressure in said cylinder, and a heat absorber adapted to receive the engine exhaust and the heated fluid from said jacket and to absorb the heat thereof.

22. In a power generating system, a heat engine having a cylinder and a jacket adapted to receive a heat absorbing fluid, means for circulating the fluid under pressure in said jacket to counteract the pressure in said cylinder, and a heat absorbing and power generating unit adapted to receive and utilize the heated fluid from said jacket and drive said circulating means.

23. In a power generating system, a heat engine having a cylinder and a jacket adapted to receive a heat absorbing fluid, means for circulating said fluid under pressure in said jacket, means for maintaining the pressure of said fluid at a predetermined value to counteract motive fluid pressure in the cylinder, and a heat absorbing and power generating unit adapted to receive and utilize the heated fluid from said jacket and drive said pressure-maintaining means.

24. In a power generating system, a heat engine having a jacket adapted to receive a heat absorbing fluid, a pump for circulating the fluid in said jacket at a pressure to counteract motive fluid pressure, a steam generator receiving the heated fluid from said jacket, and an engine receiving steam from said steam generator and driving said pump.

25. In a power generating system, a heat engine having a jacket adapted to receive a heat absorbing fluid under pressure to counteract motive fluid pressure, a pump for maintaining the pressure of said heat absorbing fluid constant, a steam generator receiving the heated fluid from said jacket, and an engine receiving steam from said steam generator and driving said pump.

26. In a power generating system, a heat engine having a pressure chamber or cylinder and a jacket adapted to receive a heat absorbing fluid, an accumulator connected to said jacket and adapted to maintain the fluid under pressure therein to counteract the motive fluid pressure in said cylinder, and a heat absorbing and power generating unit adapted to receive the heated fluid from said jacket and absorb the heat therefrom.

27. In a power generating system, a heat engine having a pressure chamber or cylinder and a jacket adapted to receive a heat absorbing fluid, an accumulator connected to said jacket and adapted to maintain the fluid under pressure therein to counteract the motive fluid pressure in said cylinder, and a heat absorbing and power generating unit adapted to receive the heated fluid from said jacket and the exhaust from the engine and absorb the heat therefrom.

28. In a power generating system, a heat engine having a pressure chamber or cylinder and a jacket adapted to receive a heat absorbing fluid, means for maintaining said fluid in a superheated condition and under pressure in said jacket to counteract motive fluid pressure, and a heat absorbing and power generating unit adapted to receive the heated fluid from said jacket, said unit having a fluid maintained separate from and to be heated by the heated fluid received from said jacket.

29. In a power generating system, a heat engine having a pressure chamber or cylinder and a jacket adapted to receive a heat absorbing fluid, means for maintaining said fluid in superheated condition and under pressure in said jacket to counteract motive fluid pressure, a heat absorbing and power generating unit adapted to receive the heated fluid from said jacket, and means for controlling the temperature of the fluid.

30. The method of operating a heat engine having a pressure chamber or cylinder, comprising, maintaining a hot motive fluid to the inside of said pressure chamber or cylinder, and maintaining the walls of the pressure chamber or cylinder under pressure of an external cooling fluid to counteract the motive fluid pressure and cool the cylinder.

31. The method of operating a heat engine having a pressure chamber or cylinder, comprising, a hot motive fluid to the inside of said pressure chamber or cylinder, and applying to the walls of the pressure chamber or cylinder an external cooling fluid under pressure for counteracting the internal pressure in the pressure chamber or cylinder and cooling the cylinder.

32. The method of operating a heat engine having a pressure chamber or cylinder, comprising, maintaining a hot motive fluid to the inside of said pressure chamber or cylinder, and supporting the walls of the pressure chamber or cylinder by hydraulic pressure against the pressure in said pressure chamber or cylinder, the hydraulic pressure medium acting to cool the cylinder.

33. The method of operating an internal combustion engine having a pressure chamber or cylinder and employing a cooling medium, comprising, igniting a combustible gas in said pressure chamber or cylinder, and maintaining the cooling medium around the cylinder at a pressure value sufficient to counteract the pressure of the ignited gas.

34. The method of operating an internal combustion engine having a pressure chamber or cylinder and employing a cooling medium, comprising, igniting a combustible gas in said pressure chamber or cylinder, and circulating the cooling medium around the cylinder at a pressure value sufficient to counteract the pressure of the ignited gas.

35. The method of operating an internal combustion engine having a pressure chamber or cylinder and employing a cooling medium, comprising, igniting a combustible gas in said pressure chamber or cylinder, and maintaining the cooling medium under pressure around the cylinder to support the walls of the pressure chamber or cylinder against the internal pressure therein.

36. In a power generating system, a heat engine having a cylinder, and fluid pressure means adapted to supply a cooling fluid for supporting the walls of the pressure chamber or cylinder externally against the internal pressure in said pressure chamber or cylinder and for cooling said cylinder.

37. In a power generating system, a heat engine having a thin walled cylinder and a fluid-receiving jacket, and means for circulating a cooling fluid under pressure in said jacket to cool the cylinder and counterbalance the pressure therein.

38. In a power generating system, a heat engine having a thin walled cylinder and a fluid-receiving jacket, and means for automatically maintaining a cooling fluid in said jacket under a predetermined pressure to cool the cylinder and counterbalance the pressure thereon.

39. In a power generating system, a heat engine having a thin-walled cylinder and a fluid-receiving jacket, means for circulating a cooling fluid under pressure in said jacket, and means for maintaining the pressure of said fluid at a predetermined value sufficient to counterbalance the pressure within the cylinder.

40. In a power generating system, a heat engine having a cylinder, fluid pressure means for supporting the walls of the pressure chamber or cylinder externally against the internal pressure in said pressure chamber or cylinder, and means for varying the fluid pressure in accord with said internal pressure.

41. In a power generating system, a heat engine having a cylinder, fluid pressure means for supporting the walls of the pressure chamber or cylinder externally against the internal pressure in said pressure chamber or cylinder, and means for automatically maintaining the fluid pressure at a predetermined value in accord with said internal pressure.

42. In a power generating system, a heat engine having a cylinder and a fluid-receiving jacket, means for maintaining a cooling fluid in said jacket under pressure, and means for varying the fluid pressure in said jacket in accord with the pressure in said cylinder.

43. In a power generating system, a heat engine having a cylinder and a fluid-receiving jacket, means for automatically maintaining a cooling fluid in said jacket under a predetermined pressure, and means for varying the value of the predetermined pressure of the fluid in accord with the pressure in the cylinder.

44. In a power generating system, a heat engine having a pressure chamber or cylinder and a fluid-receiving jacket, means for maintaining a cooling fluid under pressure in said jacket, and means responsive to variations of the fluid pressure for maintaining the pressure thereof at a predetermined value in accord with the pressure in the cylinder.

45. In a power generating system, a heat engine having a pressure chamber or cylinder and a fluid-receiving jacket, means for maintaining a fluid under pressure in said jacket to counteract motive fluid pressure in the cylinder, and means for maintaining the volume of the fluid constant.

46. In a power generating system, a heat engine having a pressure chamber or cylinder and a fluid-receiving jacket, means for maintaining a fluid under pressure in said jacket to counteract motive fluid pressure in the cylinder, means for maintaining a predetermined volume of the fluid, and means for varying the predetermined volume of the fluid.

47. In a power generating system, a heat engine having a pressure chamber or cylinder and a fluid-receiving jacket, means for maintaining a fluid under pressure in said jacket to counteract motive fluid pressure in the cylinder, and means for automatically maintaining the volume of the fluid constant.

48. In a power generating system, a heat engine having a pressure chamber or cylinder and a fluid-receiving jacket, means for circulating a fluid under pressure in said jacket to counteract motive fluid pressure in the cylinder, and means for automatically maintaining the volume of the circulating fluid constant.

49. In a power generating system, a heat engine having a pressure chamber or cylinder and a fluid-receiving jacket, means for circulating a predetermined volume of fluid under pressure in said jacket to counteract motive fluid pressure in the cylinder, and means responsive to variations of the fluid volume for controlling the predetermined volume of the fluid.

50. In a power generating system, a heat engine having a pressure chamber or cylinder and a fluid-receiving jacket, and an accumulator connected to said jacket and adapted to maintain a fluid under pressure therein to counteract motive fluid pressure within the cylinder.

51. In a power generating system, a heat engine having a pressure chamber or cylinder and a fluid-receiving jacket, an accumulator connected to said jacket and adapted to maintain a cooling fluid under pressure therein for counteracting motive fluid pressure within the cylinder, and means for controlling said accumulator adapting it to maintain the determined pressure in the jacket.

52. In a power generating system, a heat engine having a pressure chamber or cylinder and a fluid-receiving jacket, an accumulator connected to said jacket and adapted to maintain a cooling fluid under pressure therein for counteracting motive fluid pressure within the cylinder, and means operable upon a decrease of fluid in said accumulator to supply fluid thereto.

53. In a power generating system, a heat engine having a pressure chamber or cylinder and a fluid-receiving jacket, an accumulator connected to said jacket and adapted to maintain a cooling fluid under pressure therein for counteracting motive fluid pressure within the cylinder, and a pump adapted to supply fluid to said accumulator.

54. In a power generating system, a heat engine having a pressure chamber or cylinder and a fluid-receiving jacket, an accumulator connected to said jacket and adapted to maintain a cooling fluid under pressure therein for counteracting motive fluid pressure within the cylinder, a pump adapted to supply fluid to said accumulator, and means operable upon a decrease of the fluid in said accumulator adapted to control said pump.

55. In a power generating system, a heat engine having a pressure chamber or cylinder and a fluid-receiving jacket, an accumulator connected to said jacket and adapted to maintain a cooling fluid under pressure therein for counteracting motive fluid pressure within the cylinder, a pump adapted to supply fluid to said accumulator, and means for controlling said pump adapted to keep the supply of fluid in said accumulator constant.

56. In a power generating system, a heat engine having a pressure chamber or cylinder and a fluid-receiving jacket, an accumulator connected to said jacket and adapted to maintain a cooling fluid under pressure therein for counteracting motive fluid pressure within the cylinder, a pump adapted to supply fluid to said accumulator, and means operable upon a decrease or increase of fluid in said accumulator for controlling said pump adapted to keep the supply of fluid in said accumulator constant.

57. In a power generator system, a heat engine having a pressure chamber or cylinder and a fluid-receiving jacket, and a circulating system including a pump and an accumulator adapted to circulate a fluid under pressure in said jacket to counteract motive fluid pressure in the cylinder.

58. In a power generating system, a heat engine having a pressure chamber or cylinder and a fluid-receiving jacket, a circulating system including a pump and an accumulator adapted to circulate a cooling fluid under pressure in said jacket for counteracting motive fluid pressure within the cylinder, and means for controlling said accumulator adapting it to maintain the determined pressure in the jacket.

59. In a power generating system, a heat engine having a pressure chamber or cylinder and a fluid-receiving jacket, a circulating system including a pump and an accumulator adapted to circulate a cooling fluid under pressure in said jacket for counteracting motive fluid pressure within the cylinder, and an auxiliary pump connected to supply the fluid to said circulating system.

60. In a power generating system, a heat engine having a pressure chamber or cylinder and a fluid-receiving jacket, a circulating system, including a pump and an accumulator adapted to circulate a fluid under pressure in said jacket, an auxiliary pump connected to supply the fluid to said circulating system, and means responsive to variations in pressure in said circulating system adapted to control said auxiliary pump.

61. In a power generating system, a heat engine having a pressure chamber or cylinder and a fluid-receiving jacket, a circulating system including a pump and an accumulator adapted to circulate a cooling fluid under pressure in said jacket for counteracting motive fluid pressure within the cylinder, an auxiliary pump connected to supply the fluid to said circulating system, and means responsive to variations in the volume of the fluid in said accumulator adapted to control said auxiliary pump to keep the volume of fluid in said accumulator constant.

62. In a power generating system, a heat engine having a pressure chamber or cylinder and a fluid-receiving jacket, and a circulating system including a radiator, a pump and an accumulator coöperating with means adapted to circulate a fluid under pressure in said jacket for counteracting motive fluid pressure in the cylinder.

63. In a power generating system, a heat engine having a thin walled pressure chamber or cylinder and a fluid-receiving jacket, and means for maintaining a fluid in superheated condition in said jacket to counteract motive fluid pressure in the cylinder.

64. In a power generating system, a heat engine having a pressure chamber or cylinder and a fluid-receiving jacket, means for maintaining a cooling fluid under pressure in said jacket for counteracting motive fluid pressure within the cylinder, and means for controlling the temperature of the fluid.

65. In a power generating system, a heat engine having a pressure chamber or cylinder and a fluid-receiving jacket, and means for automatically maintaining a cooling fluid at a predetermined pressure and temperature in said jacket for counteracting motive fluid pressure in the cylinder and cooling the latter.

66. In a power generating system, a heat engine having a pressure chamber or cylinder and a fluid-receiving jacket, and means for maintaining a cooling fluid under pressure in said jacket for counteracting motive fluid pressure in the cylinder, and means for varying the temperature of the fluid.

67. In a power generating system, a heat engine having a pressure chamber or cylinder and a fluid-receiving jacket, means for automatically maintaining a cooling fluid at a predetermined pressure and temperature in said jacket for counteracting motive fluid pressure in the cylinder, and means for varying the pressure of the fluid adapted to vary the value of the predetermined temperature.

68. In a power generating system, a heat engine having a pressure chamber or cylinder, and means for maintaining the walls of said pressure chamber or cylinder under a predetermined external fluid pressure and at a predetermined temperature for counteracting motive fluid pressure in the cylinder.

69. In a power generating system, a heat engine having a cylinder and fluid-receiving jacket, means for maintaining a cooling fluid in said jacket under pressure to counteract motive fluid pressure in the cylinder, and means for varying the temperature of the fluid.

70. In an internal combustion engine, a cylinder having a fluid-receiving jacket, a comparatively thin liner in said cylinder in contact with the fluid in said jacket, and connections to said fluid-receiving jacket adapted to supply cooling fluid under pressure thereto for counteracting motive fluid pressure within the cylinder.

In testimony whereof I affix my signature in the presence of two witnesses.

ALBERT J. MEIER.

Witnesses:
  I. M. DUNLOP,
  A. K. QUICKERT.